US006892190B2

(12) United States Patent
Hatori et al.

(10) Patent No.: US 6,892,190 B2
(45) Date of Patent: May 10, 2005

(54) METHOD AND APPARATUS FOR MACHINE TRANSLATION AND RECORDING MEDIUM

(75) Inventors: Hiromi Hatori, Yokohama (JP); Tomohiro Miyahira, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 09/910,268

(22) Filed: Jul. 19, 2001

(65) Prior Publication Data

US 2002/0065647 A1 May 30, 2002

(30) Foreign Application Priority Data

Sep. 20, 2000 (JP) ........................................ 2000-285811

(51) Int. Cl.[7] .......................... G06F 15/18; G06F 17/27; G06F 17/28
(52) U.S. Cl. ............................. 706/12; 704/253; 704/9; 704/2
(58) Field of Search .......................... 706/12; 704/253, 704/9, 2

(56) References Cited

U.S. PATENT DOCUMENTS

| | | | | | |
|---|---|---|---|---|---|
| 5,369,574 | A | * | 11/1994 | Masegi et al. | 704/9 |
| 6,035,269 | A | * | 3/2000 | Kim | 704/9 |
| 6,182,027 | B1 | * | 1/2001 | Nasukawa et al. | 704/2 |
| 6,233,545 | B1 | * | 5/2001 | Datig | 704/2 |
| 6,789,057 | B1 | * | 9/2004 | Morimoto et al. | 704/42 |

FOREIGN PATENT DOCUMENTS

| | | |
|---|---|---|
| JP | 05-061902 | 3/1993 |
| JP | 07-141375 | 6/1995 |
| JP | 08-166955 | 6/1996 |

OTHER PUBLICATIONS

H. Hatori, et al., *Translation Word Selection of Pattern Based Translation System Palm Tree*, Proceedings of IPSJ 59th Nat'l Convention, pp. 2–365 to 2–366, (1999).
K. Takeda, *Pattern–Based Context–Free Grammars for Machine Translation*, Proc. of the 34th Mtg. of the Assoc. for Computational Linguistics (ACL '96), pp. 144–151, (1996).

* cited by examiner

*Primary Examiner*—George Davis
(74) *Attorney, Agent, or Firm*—Akerman Senterfitt (57) ABSTRACT

Disclosed herein is a machine translation system which can automatically switch from one or more dictionaries to more appropriate dictionaries for translating a first language to a second language. As a dictionary constitution, a base dictionary and domain dictionaries can be provided. The domain dictionary can be divided into a compound word dictionary that includes triggers for switching dictionaries and a compound word dictionary that does not include triggers for switching the dictionaries. When a compound word included in the compound word dictionary that includes triggers for switching the dictionaries is detected during source text analysis, a priority of the concerned domain dictionary can be set higher than that of the base dictionary. Moreover, the domain dictionary can be subdivided into a main domain dictionary and a sub-domain dictionary.

11 Claims, 10 Drawing Sheets

METHOD AND APPARATUS FOR MACHINE TRANSLATION AND RECORDING MEDIUM

CROSS-REFERENCE TO RELATED APPLICATIONS

This application claims the benefit of Japanese Application 2000-285811, filed Sep. 20, 2000.

BACKGROUND OF THE INVENTION

1. Technical Field

The present invention relates to a machine translation system. More particularly, the present invention relates to a machine translation method and apparatus which can automatically switch between multiple dictionaries. The present invention also relates to a machine-readable storage medium for storing a program for executing such a machine translation method.

2. Description of the Related Art

In general, a machine translation system includes one or more domain dictionaries having technical terms registered therein for each of various domains or fields such as politics, sports and art. Additionally, a base dictionary having common words registered therein and a user dictionary having words proper to a user registered therein by the user can be included. The machine translation system executes translation processing by selective use of these dictionaries. For example, a translation software named "Internet King of Translation (a trademark of IBM Corp.)", which is marketed by the present applicant in Japan, includes six domain dictionaries which are categorized as follows: "Internet", "Art", "Business", "Sports", "Politics" and "Entertainment", as well as a base dictionary. To improve translation quality, dictionaries for use in translations, particularly domain dictionaries must be appropriately selected. Typically, however, a user selects or switches dictionaries by him/herself depending on the source text to be translated.

Some technologies for automatically selecting or switching dictionaries from one to another also are known in the art. In automatically switching dictionaries from one to another, ideally, an appropriate dictionary, according to a domain related to a source text, should be selected after grasping the gist of the source text. Oftentimes, however, the gist cannot be readily grasped. Moreover, in a text in which topics are switched from one to another, it can be difficult to determine a point or a portion of the text in which domain dictionaries should be switched from one to another. For this reason, a typical method currently performed for automatically switching dictionaries from one to another utilizes an appropriate and predetermined keyword for each dictionary. A domain dictionary including the keyword can be selected when the keyword appears in the source text.

In addition, the present inventors have developed a method of automatically switching dictionaries entitled "Translation Word Selection of Pattern Based Translation System PalmTree" described in the Proceedings of IPSJ 59th National Convention, 1999, p. 2-365 to p. 2-366. According to this method, dictionaries are constituted of a system base dictionary (base dictionary) and domain dictionaries. Compound words and single words are classified respectively in the base dictionary and the domain dictionaries. Further the compound words are used as triggers for setting priorities of words higher. By using such a method, more appropriate selection of translated words is enabled.

Note that, in the gazette of Japanese Patent Laid-Open No. Hei 8 (1996)-166955, a method in which a list having pairs of original words and translated words is prepared and a priority order of a plurality of domain dictionaries is determined depending on how words in a source text match the pairs is disclosed. In addition, in the gazette of Japanese Patent Laid-Open No. Hei 7 (1995)-141375, a method in which a user statically designates a priority order in advance by use of a plurality of domain dictionaries is disclosed. Moreover, in the gazette of Japanese Patent Laid-Open No. Hei 5 (1993)-61902, a method in which a domain of a source text is identified by a keyword, and an order of translated words in a system dictionary is changed is disclosed.

In the case where translated words are created by use of a domain dictionary, a more appropriate translated sentence can be created by setting the priority of the domain dictionary higher thereafter. However, even in the case of using this method, particular aspects can be improved as follows.

In general, frequently used single words and compound words can be registered in the base dictionary. General compound words registered in the base dictionary include proper nouns such as team names and athlete names of sports teams and movie titles. These proper nouns are proper words for each of, for example, a sports domain and an entertainment domain, and further, can be effective triggers for automatically switching dictionaries. However, words proper to the domain such as these proper nouns are not registered in an appropriate domain dictionary but a base dictionary because these words are well known (frequently used) in general. For this reason, switching between dictionaries does not function effectively, thus causing a defect that switching to an expected dictionary during translation processing is not realized.

Moreover, words can be registered in the domain dictionary with expressions proper to the domain. For example, in the case where "this season" is expressed in English, an appropriate Japanese translation can be "kon shiizun" in the sports domain. Accordingly, these words are registered as "this season=kon shiizun" in a compound word dictionary of the sports domain. However, "this season" are originally general words. In the base dictionary, "this season=kono kisetsu" should be registered. When the compound words "this season" are inputted at the time of translating a general document rather than a topic of the sports domain, the compound word becomes a trigger to set the priority of the sports domain higher. Thus the sports domain dictionary comes to be used at a position where the base dictionary should be used. This implies a switching to an unexpected dictionary during translation, which can cause a defect wherein a translated sentence can be inappropriate. This problem in which general words can be simultaneously an expression proper to a specified domain is not limited between Japanese and English. Rather, the problem can be an essential problem in translation wherein vocabularies of different kinds of languages do not conceptually coincide with each other completely. For example, in the case of the expression "chateau" in French, a general translated word thereof into English is "castle". However, when the French expression "chateau" is used concerning the Bordeaux region, the word "chateau" means "winery". As described above, even if a certain language has only one expression for a plurality of meanings, oftentimes the other language has an appropriate expression for each of the plurality of meanings. Accordingly, a translated word for the one expression with a plurality of meanings as described above should not be used for a trigger for switching dictionaries. Note that, in the description of "chateau" in French, an "accent circumflex" should be originally added on the letter "a" following the letters "ch". Herein, the letter is simply described as "a" in a relation with the letter code. The description will be the same below in this specification.

Furthermore, there is a defect that the domain constitution in the prior art does not conform to a selection range for appropriate translated words. For example, there is an English single word "shot" corresponding to the Japanese single word "shotto" or "shuuto" in the sports domain. In Japanese, the word "shotto" has been conventionally used as a term for golf, and "shuuto" as a term for soccer or basketball. In order to create a more appropriate translated sentence, it is necessary to prepare a dictionary capable of creating a translated word appropriate for each of the sports domains, that is, golf, football, basketball, and the like.

SUMMARY OF THE INVENTION

An object of the present invention is to provide a translation system capable of automatically switching dictionaries more appropriately.

Another object of the present invention is to provide a translation system having a dictionary constitution which is capable of dealing with more detailed translation.

Still another object of the present invention is to provide a translation system capable of creating a translated sentence with higher translation quality.

A summary of the present invention will be described below. Specifically, a machine translation system of the present invention has a base dictionary and domain dictionaries in a dictionary constitution thereof. The domain dictionaries are divided into data (dictionaries) that can include triggers for switching dictionaries and data that does not include the triggers for the same. In the data that includes the triggers, words truly proper to the domain can be registered. On the other hand, in the data that does not include the triggers, words which are common words and simultaneously terms for a specified domain can be added with translated words appropriate for the respective dictionaries to be registered. As described above, data that includes the triggers and data that does not include the triggers can be divided to be registered. Thus, switching of dictionaries that is not intended can be prevented.

Moreover, the translation system of the present invention further can subdivide a domain dictionary into a main domain dictionary and a sub-domain dictionary. The domain dictionary can deal with further detailed translation to improve translation quality by subdividing it. Notably, the data that includes the triggers and the data that does not include the triggers can be divided to be registered respectively in the main domain dictionary and the sub-domain dictionary.

In one aspect of the invention, an object to be divided into the data that includes the triggers and the data that does not include the triggers can be a compound word dictionary. Single words are not suitable for determining a domain because the same spelling thereof exists in a plurality of domains in many cases. A probability of mistaking a domain determination can be lowered because the compound words which can include a plurality of words can be used in a specified domain in many cases. However, this is not to remove a division of the single word dictionary into the data that includes the triggers and the data that does not include the triggers.

Another aspect of the invention can include setting a priority of a dictionary, wherein the dictionary can be specified to be the single word dictionary or the data (compound word dictionary) that does not include the triggers. In that case, the priority of the data that includes the triggers can be maintained as is. This is because the use of a compound word registered in the base dictionary can be considered to be more preferable in the case where the same compound word is registered in both a specified domain dictionary and the base dictionary. If such a consideration is not required, the priorities of both the single words and the compound words in the data that includes the triggers can be allowed to be set higher than those in the base dictionary.

Note that the term "compound word" has a meaning of significant words that consist of two or more words in this specification.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

A description of an embodiment of the present invention, in detail, follows below with reference to the drawings. However, the present invention can be embodied in many different aspects and should not be interpreted so as to be limited to the described contents of this embodiment. Note that the same elements throughout the embodiment are added with the same reference numerals.

Although the method and the system of the present invention will be mainly described in the embodiment below, the present invention also can be embodied as a medium wherein a program code usable in a computer, as well as the method and the system as is understood by those skilled in the art, can be recorded. Accordingly, the present invention can adopt an embodiment such as hardware, software, and a combination of hardware and software. As a medium where program code is recorded, any computer-readable medium including a hard disk, a CD-ROM, an optical storage device and a magnetic storage device can be exemplified.

A computer system usable in this embodiment includes a central processing unit (CPU), a main storage device (main memory: Random Access Memory (RAM)), a nonvolatile storage device (Read Only Memory: ROM) and the like. The CPU and memories can be mutually connected via buses. As well as the above-described components, a coprocessor, an image accelerator, a cache memory, an input/output controller (I/O) and the like also can be connected to the buses. An external storage device, a data input device, a display device, a communication controller or the like can be connected to the buses through an appropriate interface. Hardware resources other than the above, which are usually provided in a computer system, can be provided therein. As a typical external storage device, a hard disk device can be exemplified. However, the external storage device is not limited to this, and can include a magneto-optical storage device, an optical storage device, and a semiconductor storage device such as a flash memory. Note that a read-only storage device such as CD-ROM or the like also can be included in the external storage device when the storage device is applied only for reading data or programs. As a data input device, an input device such as a keyboard and a pointing device such as a mouse can be provided. A voice input device also can be included in the data input device. As a display device, a CRT, a liquid crystal display device, a plasma display device, and the like can be exemplified. In the computer system of this embodiment, a variety of computers such as a personal computer, a workstation, and a mainframe computer can be included.

Although the processing system of this embodiment can be a single computer system, it also can be a network comprising a plurality of computer systems. In this case, the Internet, a LAN, a WAN, and the like can be used for communication among the computer systems. The aforementioned computer systems can be communicatively linked through communications lines including exclusive lines and public lines.

When the present invention is realized using the plurality of computer systems, the program used in each computer system can be recorded in another computer system, for example, a server computer. Specifically, a part of the program used in the computer system can be processed or executed in a distributed fashion by a remote computer, for example, another server computer or client computer. The program recorded in another computer system can be referenced with an address, DNS, URL, IP or using another address. Moreover, dictionary data to be described in this embodiment may be recorded in a distributed fashion. As expressed in the present specification, when a dictionary "includes" another dictionary, the dictionary does not need to include such another dictionary in a data structure thereof. Accordingly, the case is included, where certain data (dictionary) and another data (dictionary) are conceptually related to each other. The existence and location of the data (dictionary) recorded in a distributed fashion can be specified by use of the DNS, URL, IP, and other addresses similar to the above-described manner, thus the data can be accessed.

The Internet, as used herein, also can include an intranet and an extranet. Accordingly, when "access to the Internet" is mentioned, it also means access to an intranet or an extranet. In a term "computer network", both of a publicly accessible computer network and a computer network where only private access is permitted can be included.

Figure 1:
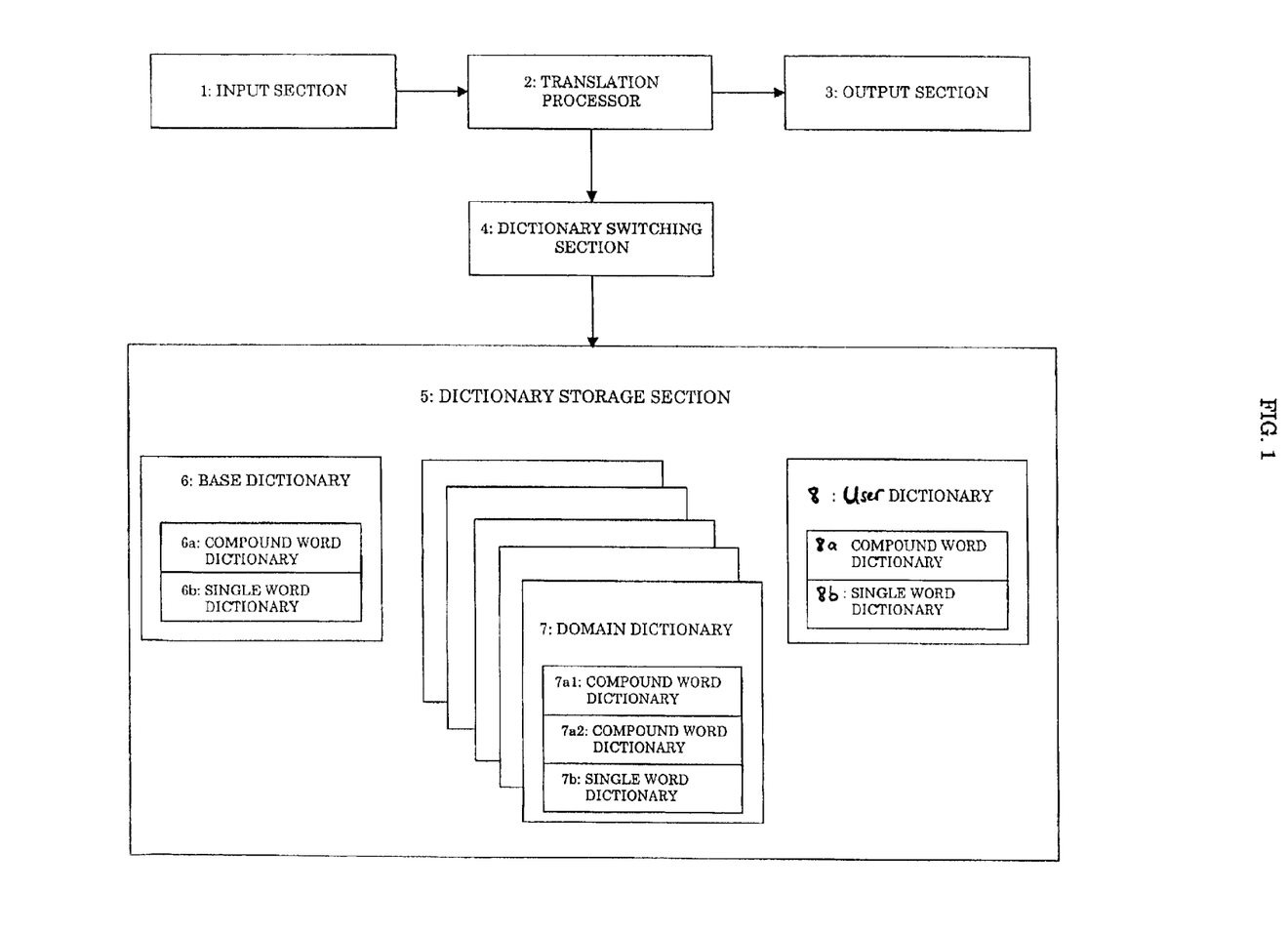
FIG. 1 is a block diagram of an exemplary machine translation system depicting one embodiment of the present invention.

FIG. 1 shows a constitution of a machine translation system according to the present invention. In an embodiment to be described below, the machine translation system executes a translation from English to Japanese. However, the present invention is not limited to the above translation, and can be applied to translation between any two languages. The machine translation system of this embodiment can comprise: an input section 1 for inputting a source text of a first language (English) to be translated; a translation processor 2 for generating a translated text of a second language (Japanese) from the inputted source text; a dictionary switching section 4 for automatically switching dictionaries from one to another, which are to be used in the translation processor 2; a dictionary storage section 5 for storing a plurality of dictionaries to be used in the translation processor 2; and an output section 3 for outputting the translated text generated in the translation processor 2. Moreover, the dictionary storage section 5 can include a base dictionary 6, domain dictionaries 7, and a user dictionary 8.

The input section 1 can be any of a keyboard, a character recognition device, a voice recognition device, a Web page screen on the Internet, and the like, as long as it can input a source text to the translation processor 2. The translation processor 2 can be a conventional and typical machine translation engine. An example of such a translation engine is described in, for example, "Pattern-Based Context-Free Grammar for Machine Translation" by K. Takeda, Proc. of 34th ACL, pp. 144–151, 1996, and "Pattern-Based Machine Translation" by K. Takeda, Proc. of 16th Coling, Vol. 2, pp. 1155–1158, 1996.

The dictionary switching section 4 constitutes an essential portion of the present invention, and automatically switches priorities of domain dictionaries stored in the dictionary storage section 5, for example, a hard disk drive, as described later. The dictionary storage section 5 stores: the base dictionary 6; the domain dictionary 7; and the user dictionary 8.

The base dictionary 6 is a dictionary registering common words. Words proper to a specified domain need not be registered in the base dictionary 6. The base dictionary 6 can include a compound word dictionary 6a and a single word dictionary 6b. The compound word dictionary can include compound words, each having a plurality of words as described above, and each compound word itself having a significance. The compound words can include variables. For example, " . . . " of "to carry out . . . " can be a variable, and "~ wo jikko suru" in Japanese can be made to correspond thereto.

The domain dictionary 7 can register or include words for each specified domain. More than one domain dictionary can exist in general. However, the domain dictionary 7 can be constituted of a single domain dictionary. The domain dictionary 7 can include compound word dictionaries 7a1 and 7a2 and a single word dictionary 7b. The compound word dictionary 7a1 can be a dictionary that includes triggers for switching dictionaries, and the compound word dictionary 7a2 can be a dictionary that does not include triggers for switching dictionaries. Functions of the compound word dictionaries 7a1 and 7a2 will be described later.

The user dictionary 8 can be a dictionary which can register words proper to a user. Such words can be defined and generated by the user. In the present invention, the user dictionary 8 is optionally provided.

The output section 3 can output a translated text generated by the translation processor 2 in a given form, for example, voice, display, printing, file storage, or the like.

Figure 2:
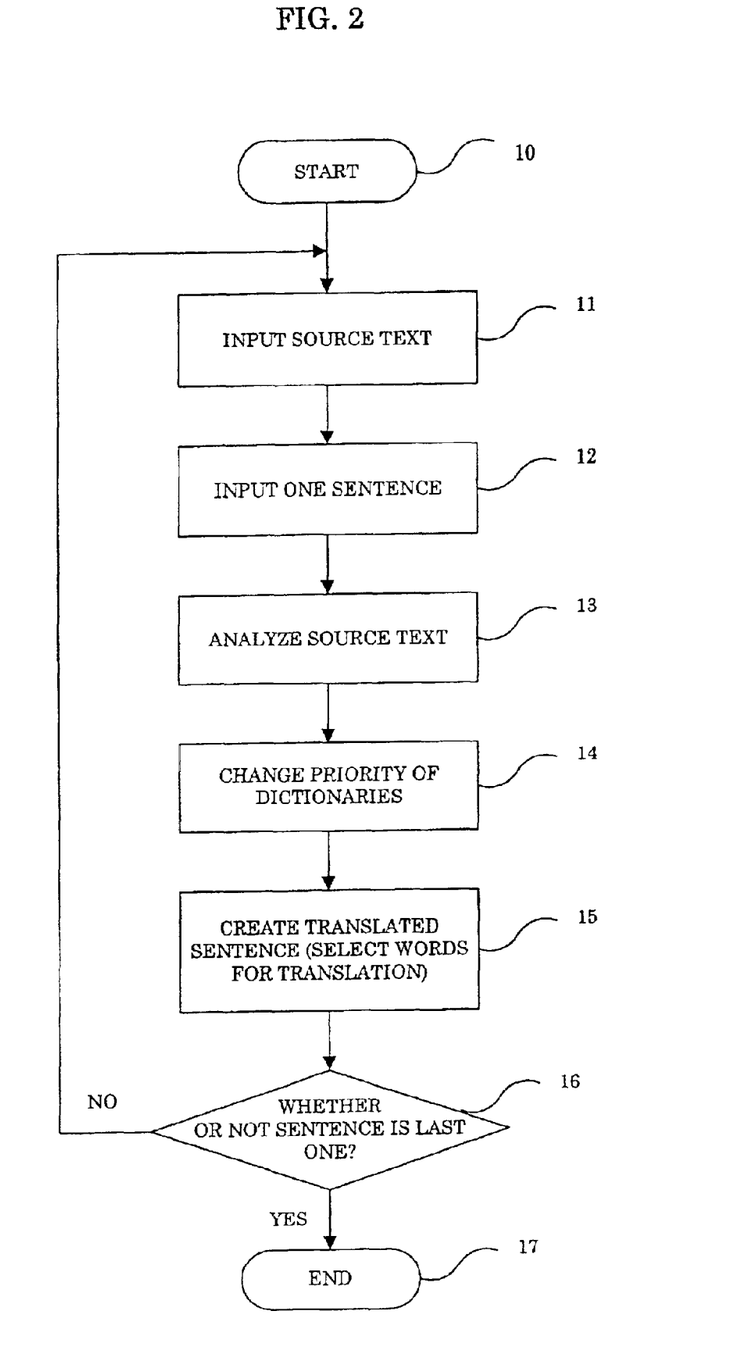
FIG. 2 is a flowchart showing an example of a flow of translation processing in the machine translation system of FIG. 1.

FIG. 2 shows an exemplary flow diagram of translation processing in the machine translation system of FIG. 1. The processing starts in start step 10, and an English source text can be inputted from the input section 1 in step 11. Next, one sentence can be extracted from the inputted source text in step 12. In the case of English, sentence punctuation can be defined at the following points: (1) a point where a period is located at the end of a word, and a head of a next word thereto is capitalized; and (2) a point where an exclamation, a colon, or a semicolon is located at the end of a word. However, even if the above condition (1) is met, there also can exist an expression, for example, "Mr.", that has a period at a portion other than the end of a sentence. Accordingly, such an expression can be stored as data, and words in a source text can be compared with the expression to define sentence punctuation when the words in the source text do not coincide with the expression. When two numbers exist so as to sandwich a period, if there is a space immediately after the period, then the source text can be punctuated at the point. If there is not a space immediately after the period, then the period can be regarded as a decimal point and the text can be continued.

After one sentence is extracted, source text analysis can be performed for the sentence in the next step 13. In source text analysis step 13, analysis can be performed as to which portion of the extracted sentence is a subject, a verb or the like. Thus, a sentence structure can be determined. In this case, compound words in all the dictionaries also can be used together with grammatical rules in order to determine the respective elements of the sentence. After the analysis for the source text is completed, the process proceeds to step 14, where priorities of the domain dictionaries can be changed. The change of the priorities will be described later. Next, in step 15, a translated sentence can be created by use of the domain dictionaries in which the word priorities may have been changed. Appropriate translated words can be obtained by use of words in the domain dictionary having a higher priority. In the next step 16, the sentence for which a translated sentence has been created can be checked to determine whether the sentence is the last sentence in the source text inputted in step 11. If the sentence is not the last one, the process returns to step 12. If the sentence is the last one, the process is terminated (step 17).

Next, the flowchart shown in FIG. 2 will be described by exemplifying an actual source text. The following example is given on the assumption that a Web page on the Internet is translated, and it is assumed that the following six dictionaries are used as the domain dictionaries 7. However, as a matter of course, in the present invention, texts other than the Web page can be translated, and domain dictionaries different from the following ones can be used.

Domain dictionaries 7 can include Internet, Art, Business, Sports, Politics, and Entertainment dictionaries. Other than the foregoing six domain dictionaries, the base dictionary 6 and the optional user dictionary 8 also can be stored in the dictionary storage section 5. The priorities of these dictionaries are initialized so as to be set in the following order from the one having higher priority: (1) User dictionary; (2) Base dictionary; (3) Internet; (4) Art; (5) Business; (6) Sports; (7) Politics; and (8) Entertainment.

The priority order of the domain dictionaries from 3 to 8 is given for convenience, but can be set in any order. For example, the priority order may be the same as the order of dictionaries that are found when a translation engine is initialized. In an initial state, the priorities of all the domain dictionaries can be set lower than that of the base dictionary. However, the priority of a specified domain dictionary (for example, a domain dictionary of the sports domain) selected by a user can be set higher than that of the base dictionary. In this case, the priorities of the other domain dictionaries are kept lower than that of the base dictionary. The priority may be controlled in any manner. For example, dictionary identification information such as dictionary names may be listed according to the priority order. Such a list of the priority order can be held in a predetermined memory region (for example, a part of the main memory) of the computer system executing the flow shown in FIG. 2.

In the machine translation, using the dictionaries as described above, it is assumed that the following two sentences are inputted in step 11: "Hiro Hatori led the Tour at 30.5%. On par-5 holes Shige Hayashi made a birdie an amazing 49.5% of the time." Herein, "Hiro Hatori" and "Shige Hayashi" are assumed to be famous golfers.

In the input step 12, one sentence can be extracted by punctuating the sentences at a point where either one above-described condition (1) or (2) is met. In this example, the following one sentence can be extracted: "Hiro Hatori led the Tour at 30.5%." Next, the source text analysis step 13 can be executed for the sentence extracted in step 12 by use of all the dictionaries denoted by numerals 1 through 8. As is well known, the respective dictionaries can include single words and compound words, and can store information regarding parts of speech which can correspond to the words respectively. Moreover, in the base dictionary, grammatical rules can be stored. Exemplary grammatical rules can include:

one noun can constitute a noun phrase;
one verb can constitute a verbal phrase;
a verbal phrase and a noun phrase can constitute another verbal phrase; and
a noun phrase and a verbal phrase can constitute a sentence, and the like.

Figure 3:
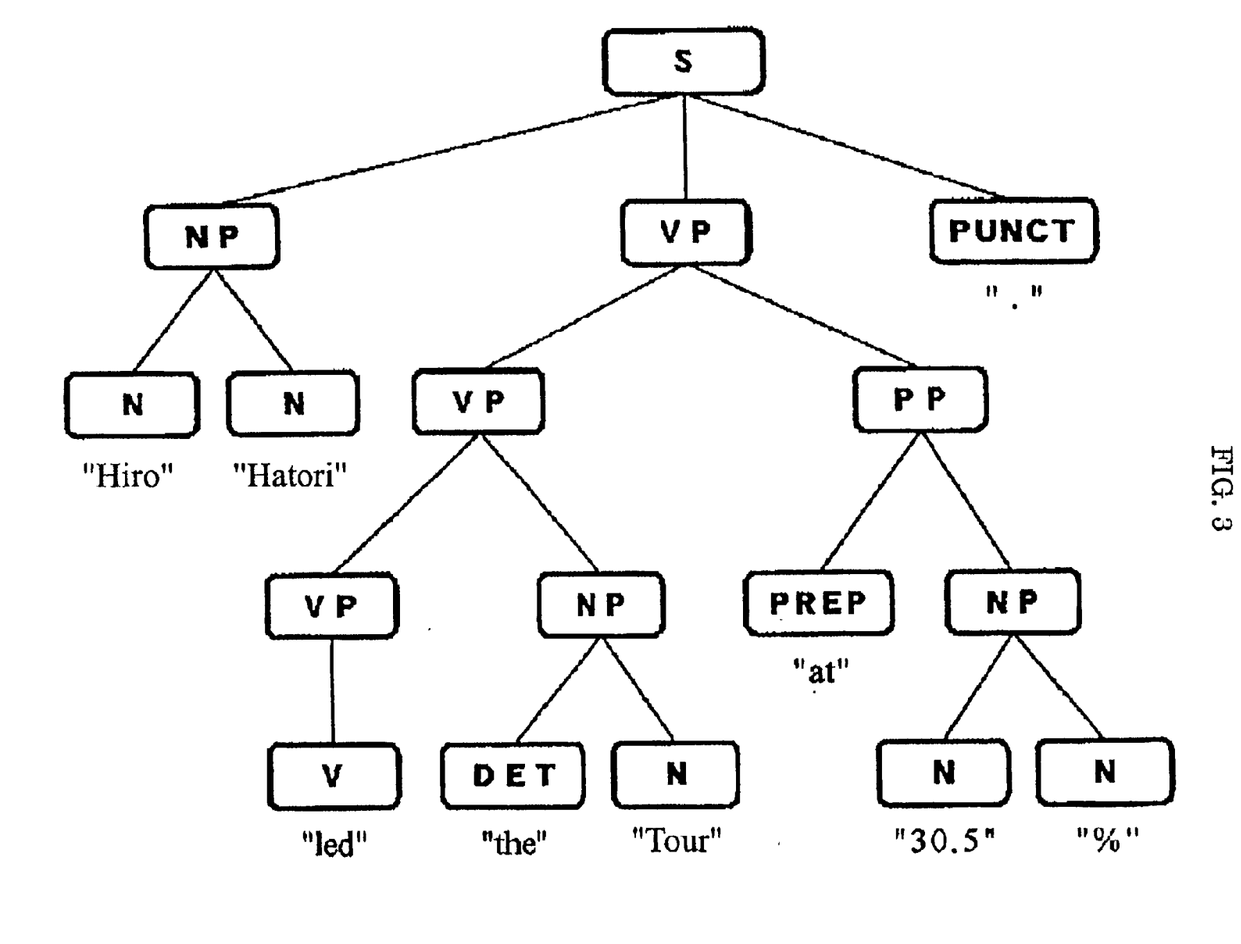
FIG. 3 is a view showing one example of a parse tree created by source text analysis.

The source text analysis step 13 can prepare a parse tree as shown in FIG. 3 using the aforementioned information. Since a method of preparing such a parse tree is well known, detailed description for the method of preparing a parse tree will be omitted.

Abbreviations shown in FIG. 3 mean as follows.
DET: article
N: noun
NP: noun phrase
PP: prepositional phrase
PREP: preposition
PUNCT: punctuation mark
S: sentence
V: verb
VP: verbal phrase The parse tree of FIG. 3 illustrates that a sentence S consists of a noun phrase NP, a verbal phrase VP and a punctuation mark PUNCT. The left branch of the three branches coming out from the sentence S, that is, the first noun phrase NP, includes two nouns "Hiro" and "Hatori". This noun phrase can be a compound word, and in this example, is registered only in the sports domain dictionary. The center branch of the syntax tree, that is, the verbal phrase VP following the noun phrase NP, includes the second verbal phrase VP and a prepositional phrase PP. The second verbal phrase VP includes a verbal phrase VP constituted of one verb "led" and a noun phrase NP constituted of an article "the" and a noun "Tour". A prepositional phrase PP consists of a preposition "at" and a noun phrase NP constituted of two nouns "30.5" and "%". The last punctuation PUNCT in the right branch is a period ".".

After the analysis of the source text is terminated, the process proceeds to dictionary priority changing step 14. In the above example, since the compound word "Hiro Hatori" is used from the sports domain dictionary, the priority order of the dictionaries can be changed as described later in detail.

In the translated sentence creation step 15, a translated sentence can be created according to the priority order list having the changed order. A translated word "Hiro Hatori" (in katakana) in the sports domain dictionary can be used for the first compound word "Hiro Hatori" because the other dictionaries do not include the same word. Next, a translated word "tsuah" (in katakana) from the sports domain dictionary can be used for the single word "Tour". The reason why a translated word "ryokoh" (in kanji; travel) for the single word "tour", which is registered in the base dictionary, is not used is because the priority of the sports domain dictionary is set higher than that of the base dictionary. The change of the priorities will be described later. Finally, the following translated sentence can be created: "Hiro Hatori wa 30.5% no tsuah wo michibikimashita."

Since the above-translated sentence is not the last sentence of the source text, the process returns from step 16 to step 12. Then, the subsequent sentence, that is, "On par-5 holes Shige Hayashi made a birdie an amazing 49.5% of the tour." can be extracted, and the same process as described above can be iterated. In this iteration, a compound word proper to the sports domain dictionary is not detected. However, as described later with reference to FIG. 4, the priority of the single words in the sports domain dictionary can still be kept higher than that of the base dictionary. Accordingly, for the single word "birdie", for example, which is registered in both the sports domain dictionary and the base dictionary, a translated word "bahdii" (in katakana) from the sports domain dictionary can be used, and a translated word "kotori" (in kanji; a little bird) from the base dictionary is not used. The same can be true of other single words. The translated sentence by the iteration can be as follows: "pah 5 no hohru de, Shige Hayashi wa tohji no odorokuyohna 49.5% (de) bahdii wo dashimashita."

Since the source text has only two sentences in the above example, the process reaches the last sentence by one iteration. Accordingly, after the second translated sentence is created, the process can be terminated (step 17). Note that these exemplary sentences were actually outputted by the machine translation system according to the present invention. (de) (in hiragana) in the second translated sentence may be revised according to users' needs.

Figure 4:
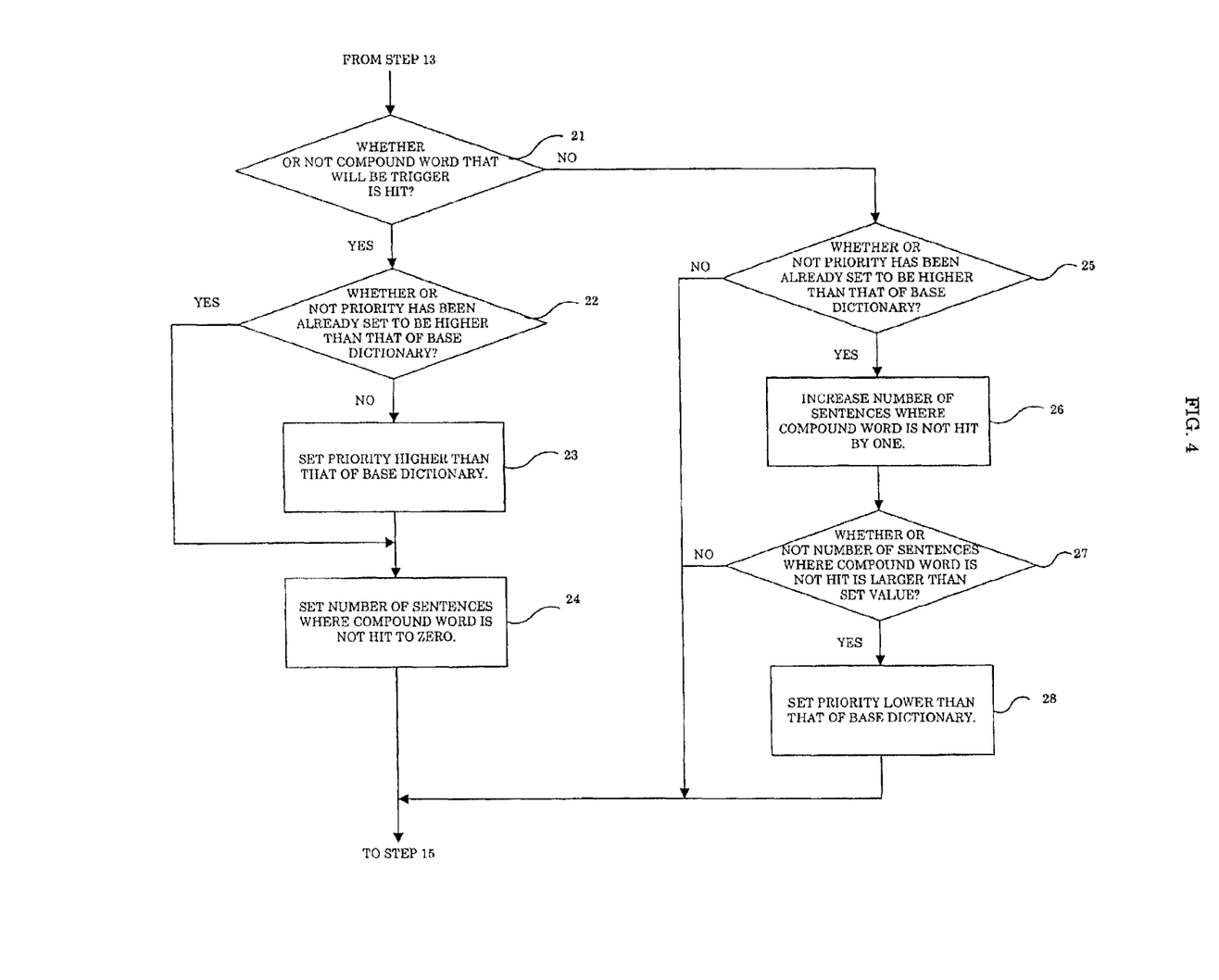
FIG. 4 is a flowchart showing one example of dictionary switching processing.

Next, with reference to FIG. 4, the process for changing priorities of the domain dictionaries, corresponding to step 14 of FIG. 2, will be described in detail. The process of FIG. 4 can be executed for each domain dictionary. First, in step 21, by referring to the analysis result of the source text as shown in FIG. 3, it is checked whether a compound word registered in the compound word dictionary T including triggers for switching dictionaries into the concerned domain dictionary was hit (used). If the compound word was hit, the process proceeds to step 22, where it can be checked whether the priority of the domain dictionary already has been set higher than that of the base dictionary by referring to, for example, the above-described priority order list. When the priority of the domain dictionary already has been set higher, the process can proceed to step 24, otherwise, to step 23. In step 23, the priority of the concerned domain dictionary can be set higher than that of the base dictionary. In the above-described example, since the compound word "Hiro Hatori" registered in the sports domain dictionary was hit, the priority of the sports domain dictionary was set higher than that of the base dictionary. In the next step 24, the number of sentences where a word is not hit, that is, the number of sentences where any compound word registered in the concerned domain dictionary is not hit is reset to 0. Thereafter, the process proceeds to step 15 of FIG. 2. This number of sentences where a compound word is not hit can be set for each domain dictionary, and can show the counted number of consecutive sentences in which the compound word in the dictionary is not hit since the compound word of the dictionary was hit for the last time. This number can be used for determining that the topic of the concerned domain is terminated when the compound word registered in a specified domain dictionary is not hit during translation for a predetermined number of consecutive sentences, for example 10. In that case, the priority of the domain dictionary can be adjusted lower than that of the base dictionary.

If a compound word registered in the domain dictionary T that includes triggers for switching dictionaries is not hit in step 21, the process can proceed to step 25. Step 25 functions in a similar fashion to step 22, that is, whether the priority of the concerned domain dictionary already has been set higher than that of the base dictionary can be checked. If the priority has not been set higher, the process returns to step 15 in the flow of FIG. 2 without performing any action. If the priority of the domain dictionary has been set higher than that of the base dictionary, the process can proceed to step 26 and the above-described number of sentences in which the compound word is not hit can be increased by 1. Next, in step 27, it can be checked whether the increased number of sentences in which the compound word is not hit is larger than a predetermined set value, for example, 10. If the number of sentences in which the compound word is not hit is equal to the set value or lower, the process can return to step 15 of the flow of FIG. 2. If the number of sentences is higher than the set value, the process can continue to step 28, where the priority of the concerned domain dictionary can be set lower than that of the base dictionary.

Figure 5:
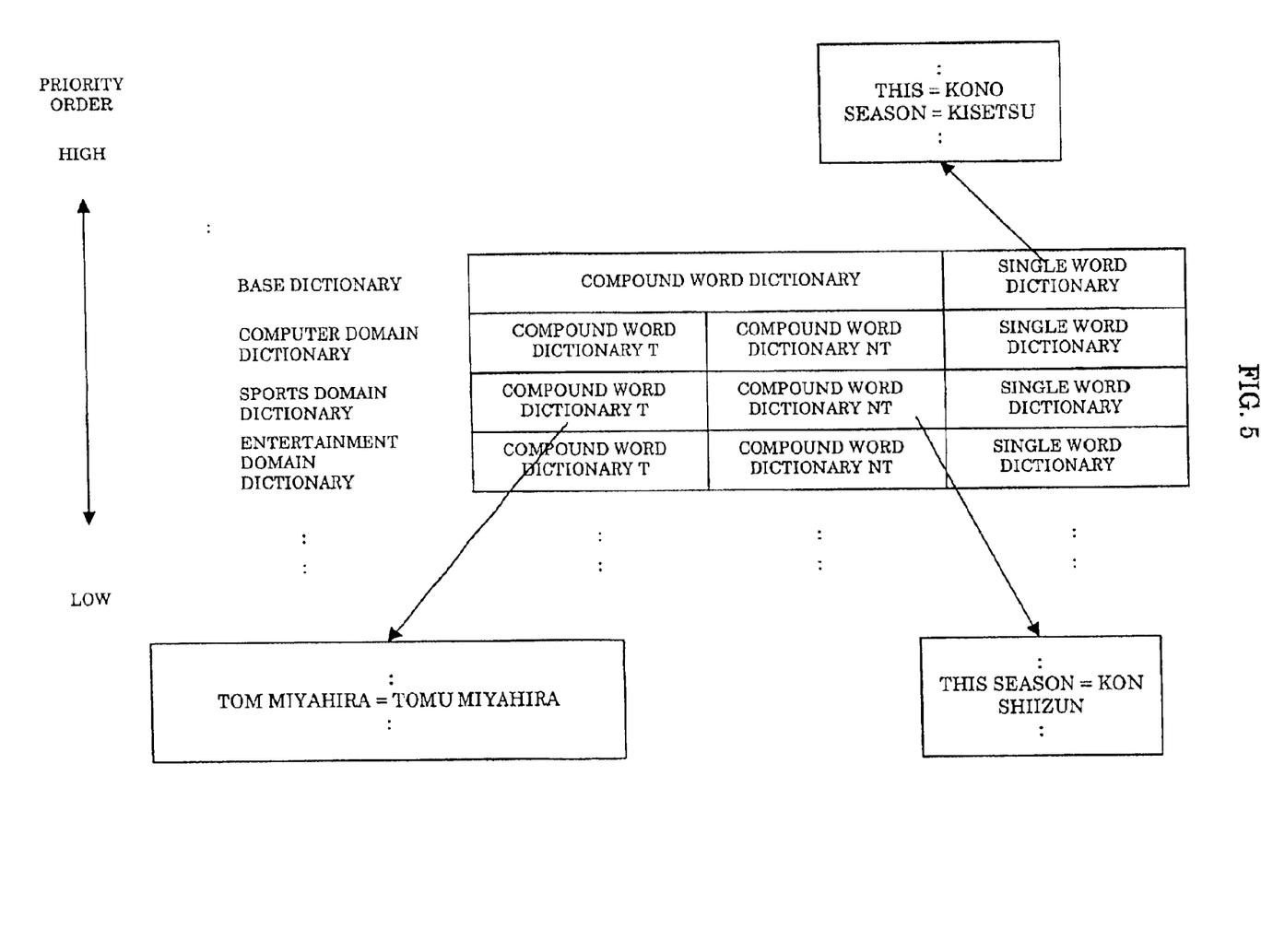
FIG. 5 is a view showing one example of a dictionary constitution embodiment.
Figure 6:
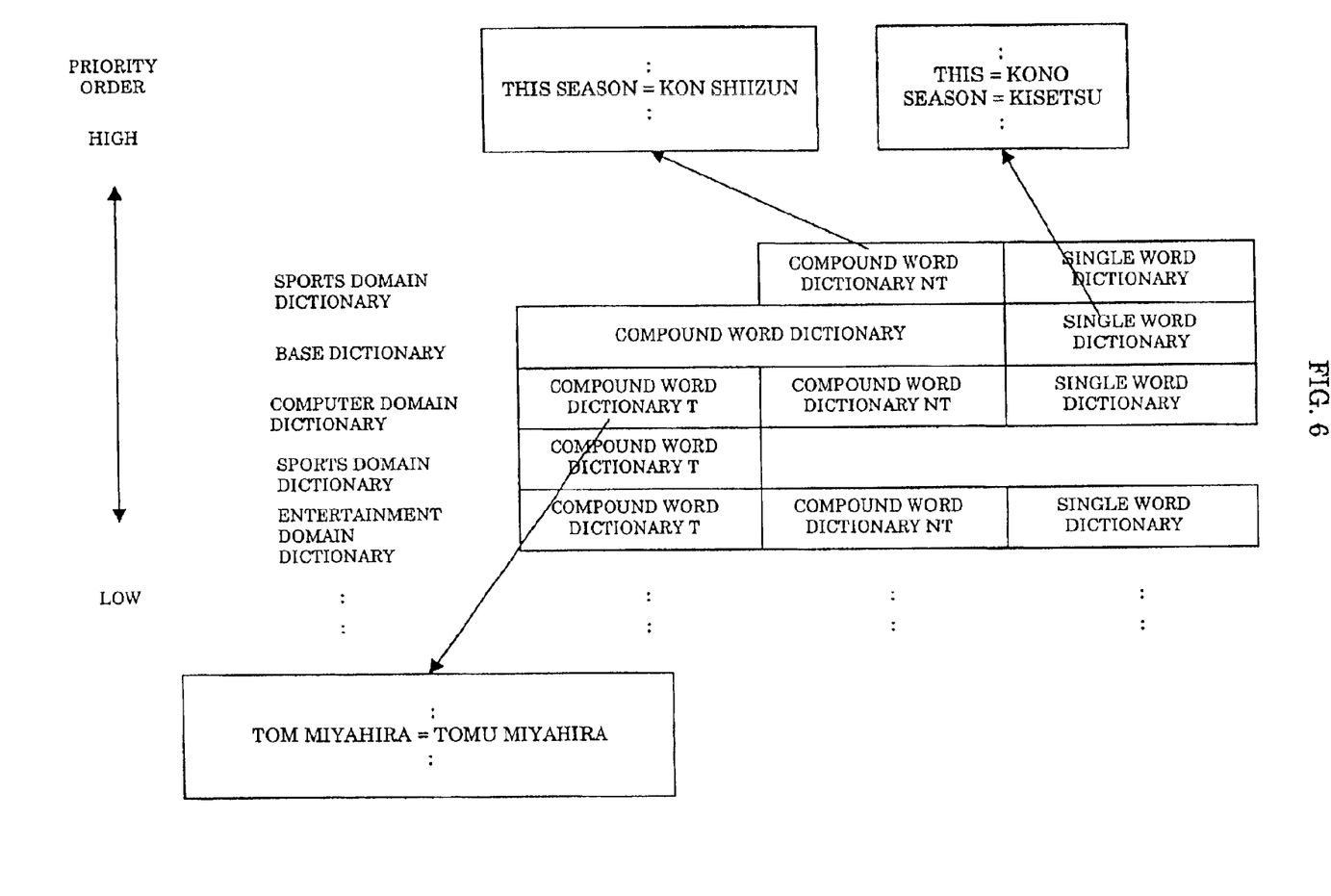
FIG. 6 is a view showing one example of a dictionary constitution embodiment after a priority order of dictionaries has been changed in the dictionary constitution of FIG. 5.

The above-described steps will be specifically described with reference to FIGS. 5 and 6. As for the priorities of the dictionaries, a dictionary located above has a higher priority as shown on the left portion of the drawing. For example, as shown in FIG. 5, the domain dictionary of baseball (a sports domain dictionary), which is a dictionary that does not include triggers for switching dictionaries, is assumed to have data "this season=kon shiizun". And, it is assumed that "this season" is not registered as a compound word but as separate single words, that is, "this=kono" and "season=kisetsu" in the base dictionary. Further, it is assumed that, for example, that the sentence "People enjoy cherry trees this season." is inputted under the situation where the priority of the sports domain dictionary is low. Herein, when all the compound words become triggers as in the prior art, the priority of the sports domain dictionary is set higher than that of the base dictionary by the compound word "this season" in the inputted sentence. Accordingly, a translation such as "Hitobito wa kon shiizun sakura wo tanoshimimasu." can be derived inappropriately. However in this embodiment, the compound word dictionary NT including "this season=kon shiizun" does not become a trigger for switching the dictionaries. Accordingly, even if "this season=kon shiizun" is registered in the sports domain dictionary, the priority of the sports domain dictionary is not raised, thus the above-described inputted sentence can be appropriately translated into "Hitobito wa kono kisetsu sakura wo tanoshimimasu."

Meanwhile, take the case wherein the inputted sentences are "Tom Miyahira is a home run batter. He hit fifty home runs this season." Herein, Tom Miyahira is assumed to be a famous baseball player. When the compound word "Tom Miyahira" is registered in the compound word dictionary T that includes the triggers, the priorities of the compound word dictionary NT and the single word dictionary of the sports domain dictionary can be set higher than that of the base dictionary by "Tom Miyahira" in the first inputted sentence as shown in FIG. 6. Then, "this season" in the second sentence can be translated to "kon shiizun" by the compound word dictionary NT of the sport domain, which has the priority set higher. Accordingly, the translation "Tomu Miyahira wa hohmuran dasha desu. Kare wa kon shiizun 50 pon no hohmuran wo uchimashita." can be appropriately made.

As described above, in this embodiment, data that will be triggers for switching dictionaries and data that will not be the triggers can be separately recorded, thus a compound word (in English) such as the above-described "this season" used both in a common way and in a specified domain, can be translated to an appropriate compound word (in Japanese) corresponding thereto by switching into an optimal dictionary. Herein, translation from an English sentence to a Japanese sentence is described. However, the present invention also can be applied to a reverse translation thereto. For example, for a Japanese phrase "~ wo shori suru", an English phrase "to process . . . " translated therefrom can be registered in the computer domain dictionary in English, and a phrase "to treat . . . " in the chemical domain dictionary, while a phrase "to deal with" is registered in the base dictionary. Alternatively, for a Japanese phrase "~ wo jikko suru", English phrases "to carry out . . . /to practice . . . " can be registered in the base dictionary, while a phrase "to run . . . " can be registered in the computer domain dictionary. Alternatively, for the Japanese phrase "~ wo hozon suru", English phrases "to preserve . . . /to conserve . . . /to keep . . . " can be registered in the base dictionary, and a phrase "to store . . . " can be registered in the computer domain dictionary. Alternatively, an English phrase in the base dictionary, that is, "to take measures" can be made to correspond to a Japanese phrase "~ te wo utsu", and a phrase "to strike a bargain . . . " in the business domain dictionary can be made to correspond thereto.

Moreover, as a matter of course, the present invention is not limited to the application for the translation between Japanese and English. For example, to a single word "chateau" in French, a single word "castle" in the English base dictionary and a single word "winery" in a domain dictionary relating to the Bordeaux region can be made to correspond.

Figure 7:
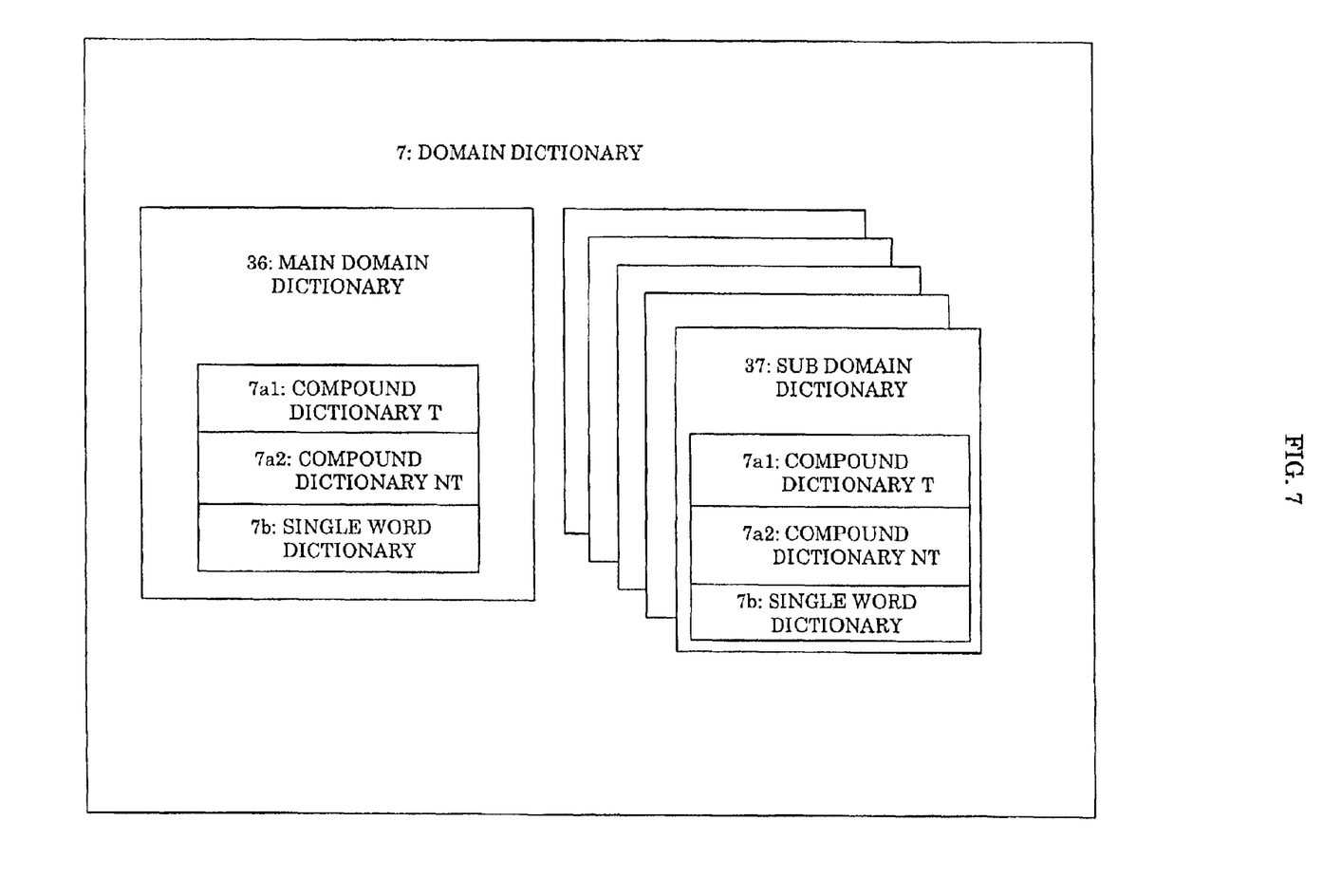
FIG. 7 is a block diagram showing one exemplary embodiment of a constitution of domain dictionaries.

A system of this embodiment can be roughly similar to the system of the invention. However, in this embodiment, each of the domain dictionaries 7 can be constituted of a main domain dictionary 36 and a sub-domain dictionary 37 as shown in FIG. 7. In general, the sub-domain dictionary 37 can exist as a plurality of sub-domain dictionaries, but can exist as a single sub-domain dictionary.

Similar to the domain dictionary, the main domain dictionary 36 and the sub-domain dictionary 37 can have a compound word dictionary T that includes triggers for switching dictionaries, a compound word dictionary NT that does not include triggers for switching dictionaries, as well as a single word dictionary. Functions of the compound word dictionary T and the compound word dictionary NT can be similar to those previously discussed.

Figure 8:
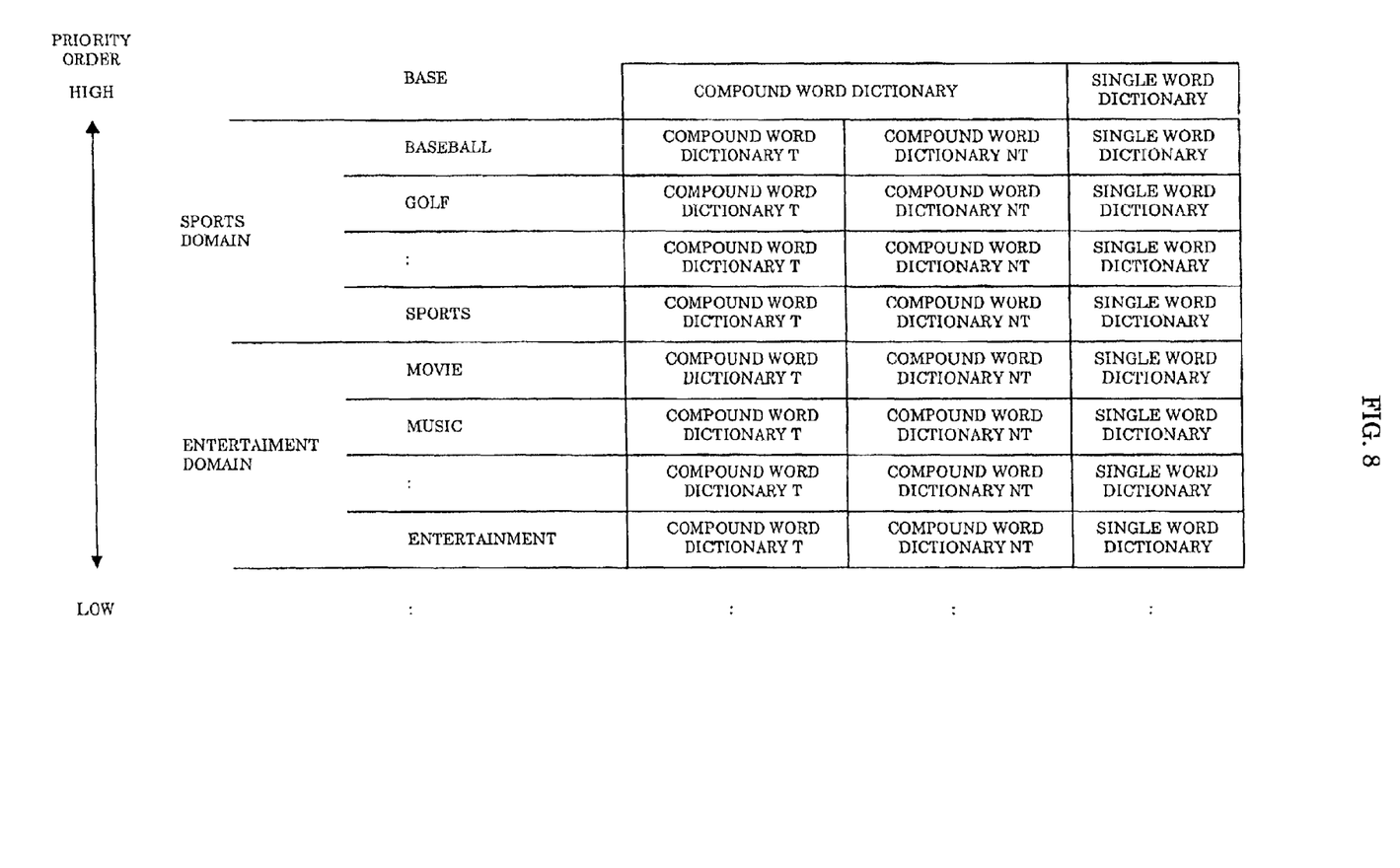
FIG. 8 is a view showing one example of a dictionary constitution embodiment.

FIG. 8 shows an exemplary embodiment of a dictionary constitution in accordance with the inventive arrangements. The base dictionary can have a similar constitution to that previously discussed. As for the domain dictionaries, for example, the sports domain can have further subdivided domains such as "baseball" and "golf". The sub-domain dictionaries can be made to correspond to the domains thus subdivided. For example, words proper to baseball can be registered in the sub-domain dictionary of baseball. Terms "Tom Miyahira", "home run" and the like can be specific to baseball and appropriate for switching dictionaries. Accordingly, the terms "Tom Miyahira", "home run" and the like can be registered in the compound word dictionary T of baseball (sub-domain) of the sports domain, which includes triggers for switching dictionaries. Meanwhile, a term that is an expression proper to baseball but is also commonly used, for example, "base line", is translated to "beesu rain; base line" (in katakana) in the baseball domain, but is commonly translated to "kijun sen; a standard line". For this reason, the term "base line" should not be used as a trigger for automatically switching dictionaries. Accordingly, when this term is registered as a compound word, it is registered in the compound word dictionary NT of the sub-domain dictionary for baseball. Incidentally, there can be a word that is used in a sports domain which cannot be classified into a specified sub-domain. The compound word "this season" is an example thereof. The use of "this season=kon shiizun" is not limited to baseball, golf or other specified sports, but is used for sports at large. Such a compound word can be classified into the main domain dictionary of the sports domain, where words for sports at large can be registered.

Figure 9:
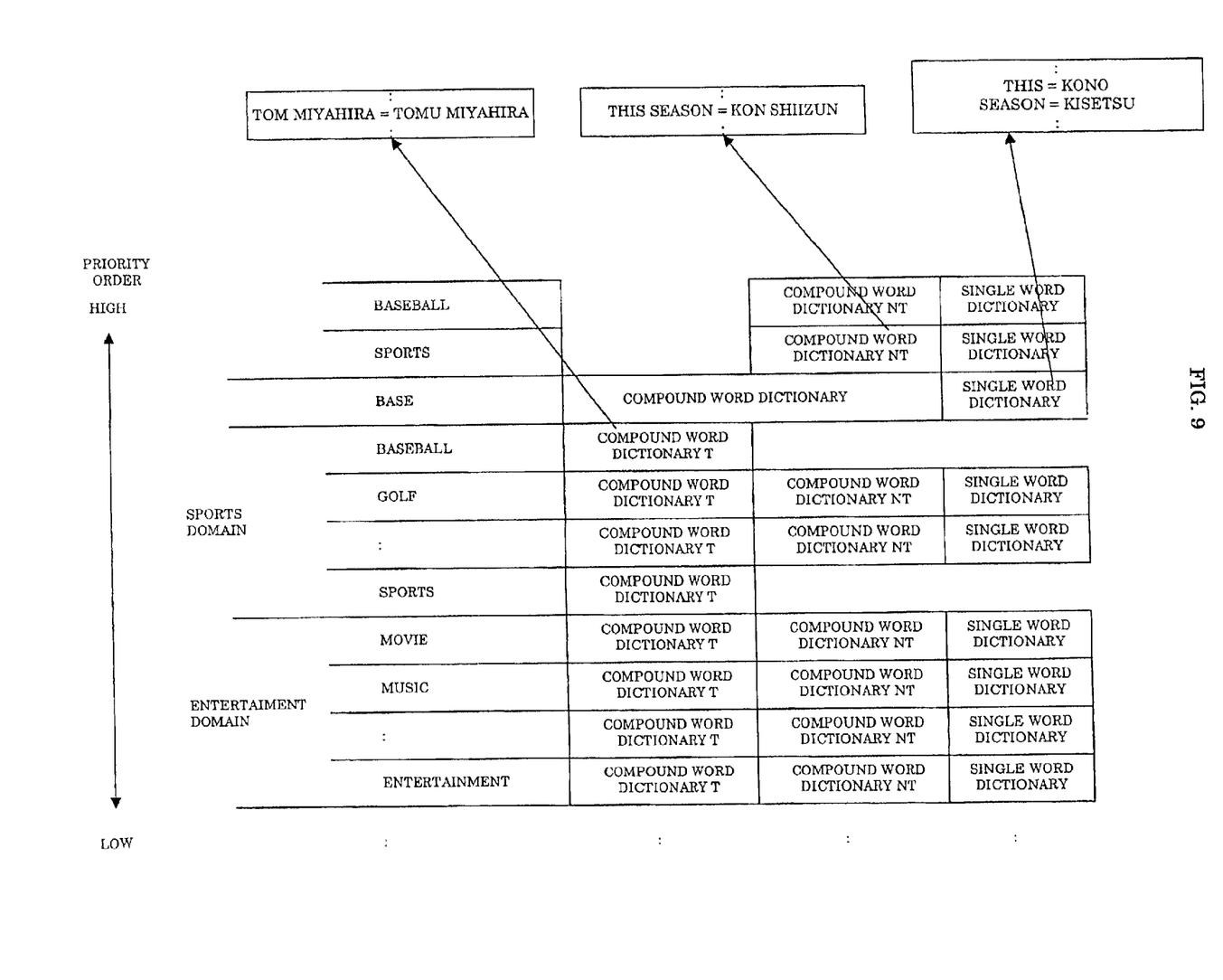
FIG. 9 is a view showing one example of a dictionary constitution embodiment after a priority order of dictionaries is changed in the dictionary constitution of FIG. 8.

The processing method disclosed herein which uses the domain dictionaries, wherein each can have domains hierarchically constituted in such a manner, can be roughly similar the embodiments previously disclosed herein. However, as shown in FIG. 9, an object, in which a priority thereof can be set higher when a compound word extracted in the source text analysis is hit, is not the whole of the domain dictionary, but rather a sub-domain dictionary to which the compound word dictionary T including the hit compound word belongs and a main domain dictionary thereof. Together with the priority of the sub-domain dictionary to which the compound word dictionary T, including the hit compound word, belongs, the priority of the main domain dictionary thereof also can be set higher. Thus, common words in the concerned domain (not common in the whole domains), which cannot be covered only with the sub-domain dictionary, can be covered. Accordingly, demerits caused by subdividing the domains can be compensated. Specifically, by subdividing the domain, translation quality for the subdivided domain (herein, sub-domain) can be improved. However, because the domain is subdivided, there is the possibility that the translation quality declines drastically when words in the source text go out of the subdivided domain. However in this embodiment, since the priority of the main domain dictionary with a larger domain is simultaneously set higher, the decline of translation quality for words peripheral on the subdivided sub-domain can be compensated. Therefore, according to this embodiment, while making it possible to designate the domains more finely, the domains also can have the same allowance, thus the decline of translation quality can be prevented. Note that the sub-domain dictionary can be further subdivided to constitute a main domain dictionary and a sub-domain dictionary thereof.

As described above, the invention made by the present inventors has been specifically described based on the embodiments of the invention. However, the present invention is not limited to the foregoing embodiments, and alterations of varying scope can be made without departing from the gist of the invention.

Figure 10:
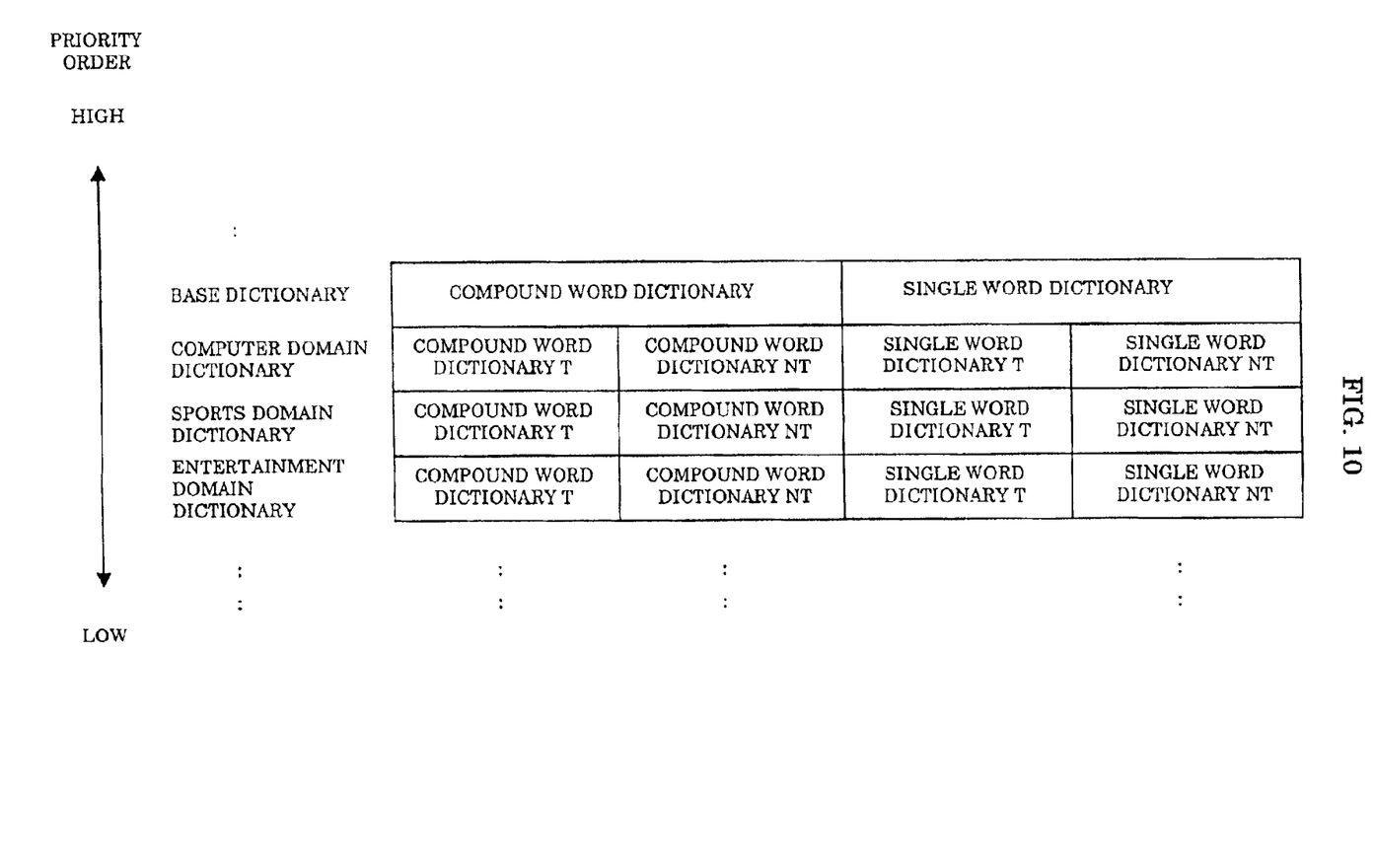
FIG. 10 is a view showing another exemplary embodiment of a dictionary constitution.

For example, though the compound word dictionary including compound words which has been described as data that will be triggers for automatically switching dictionaries is explained, as shown in FIG. 10, the single word dictionary can be divided into a single word dictionary T including single words that will be triggers for automatically switching dictionaries and a single word dictionary NT including single words that will not be triggers for automatically switching dictionaries. In that case, a judgment can be made as to whether the single word included in the single word dictionary T was hit in the step 21.

In the foregoing embodiments, description has been made for an example wherein the priority of the compound word dictionary T, including compound words that will be triggers for automatically switching dictionaries, can be maintained. Notably, it can be considered more reasonable to select the base dictionary when the same word is included in both of the compound word dictionary T of the domain dictionary (or main domain and sub-domain dictionaries) and the compound word dictionary of the base dictionary. However, when such probability is hardly conceived, the priority of the compound word dictionary T of the domain dictionary (or main domain and sub-domain dictionaries) may be set higher than that of the base dictionary. In addition, as a matter of course, the set value of the foregoing number of sentences in which a word is not hit may be other than 10.

Moreover, as described above, since the flow of FIG. 4 is executed for each of the domain dictionaries, the priorities of two or more of the domain dictionaries sometimes can be set higher than that of the base dictionary during translation of a source text inputted in step 11 of FIG. 2. For example, in a state where the priority of the sports domain dictionary is higher than that of the base dictionary, when a compound word appears in a coming sentence that is also registered in a compound word dictionary T (the compound word dictionary including compound words that will be triggers for switching dictionaries) of the politics domain dictionary, the priority of the politics domain dictionary also can be set higher than that of the base dictionary. In this case, it can be preferable that the priority of a domain dictionary in which a word is hit later be set higher than that of a domain dictionary in which a word was hit earlier.

The inventive arrangements disclosed herein can provide particular advantages. Specifically, a translation system capable of automatically switching dictionaries into more appropriate dictionaries can be provided. A translation system having a dictionary constitution capable of corresponding to a more detailed translation can be provided. A translated text having higher translation quality can be created.

Although the preferred embodiments of the present invention have been described in detail, it should be understood that various changes, substitutions, and alterations can be made therein without departing from spirit and scope of the inventions as defined by the appended claims.

What is claimed is:

1. A machine translation method for translating from a first language to a second language through the use of a base dictionary and at least one domain dictionary, in which said domain dictionary includes at least one of a first compound word dictionary and a first single word dictionary that includes triggers for changing priorities of dictionaries and at least one of a second compound word dictionary and a second single word dictionary that does not include said triggers for changing the priorities of dictionaries, said machine translation method comprising:

inputting a source text of said first language;

analyzing said inputted source text to determine at least one of a compound word and a single word that is used in said source text;

judging whether at least one of said determined compound and single words is included in at least one of said first compound word dictionary and said first single word dictionary;

setting a priority of a dictionary including at least one of said first compound word and single word dictionaries higher than that of said base dictionary if said judgment is true; and creating a translated sentence of said second language through the use of said dictionary having the priority set higher.

2. The machine translation method according to claim 1, wherein said dictionary having the priority set higher is at least one of said second compound word and single word dictionaries of said domain dictionary including at least one of said determined compound and single words.

3. The machine translation method according to claim 1, wherein said domain dictionary includes a main domain dictionary and at least one sub-domain dictionary, which belong to at least one of a domain thereof and a domain obtained by further limiting the domain, and said main domain dictionary and said sub-domain dictionary include at least one of said first compound word dictionary and said first single word dictionary that includes triggers for changing the priorities and at least one of said second compound word dictionary and said second single word dictionary that do not include triggers for changing the priorities.

4. The machine translation method according to claim 3, wherein said dictionary having the priority set higher is at least one of said second compound word and single word dictionaries of at least one of said main domain and sub-domain dictionaries including at least one of said determined compound and single words and said second compound word and single word dictionaries of said main domain belonging to the domain in which said sub-domain dictionary including at least one of the determined compound and single words is included.

5. The machine translation method according to claim 1, further comprising:

extracting one sentence from the source text of said first language, wherein said determining step, said setting step, and said step of creating a translated sentence are executed for each extracted sentence; and in said setting step, when at least one of the compound and single words included in said dictionary having the priority set higher is not used over a predetermined number of sentences after the priority of said dictionary including at least one of the determined compound and single words is set higher than that of said base dictionary, the priority of said dictionary having the priority set higher is set lower than that of said base dictionary.

6. A machine translation apparatus for translating from a first language to a second language through the use of a base dictionary and at least one domain dictionary, in which said domain dictionary includes at least one of a first compound word dictionary and a first single word dictionary that includes triggers for changing priorities of dictionaries and at least one of a second compound word dictionary and a second single word dictionary that does not include said triggers for changing the priorities of dictionaries, said machine translation apparatus comprising:

means for inputting a source text of said first language;

means for analyzing said inputted source text to determine at least one of a compound word and a single word that is used in said source text;

means for judging whether at least one of said determined compound and single words is included in at least one of said first compound word dictionary and said first single word dictionary;

means for setting a priority of a dictionary including at least one of said first compound word and single word dictionaries higher than that of said base dictionary if said judgment is true; and means for creating a translated sentence of said second language through the use of said dictionary having the priority set higher.

7. The machine translation apparatus according to claim 6, wherein said dictionary having the priority set higher is at least one of said second compound word and single word dictionaries of said domain dictionary including at least one of said determined compound and single words.

8. The machine translation apparatus according to claim 6, wherein said domain dictionary includes a main domain dictionary and at least one sub-domain dictionary, which belong to at least one of a domain thereof and a domain obtained by further limiting the domain; and said main domain dictionary and said sub-domain dictionary include at least one of said first compound word dictionary and said first single word dictionary that includes triggers for changing the priorities and at least one of said second compound word dictionary and said second single word dictionary that does not include triggers for changing the priorities.

9. The machine translation apparatus according to claim 8, wherein said dictionary having the priority set higher is at least one of said second compound word and single word dictionaries of at least one of said main domain and sub-domain dictionaries including at least one of said determined compound and single words and at least one of said second compound word and single word dictionaries of said main domain belonging to the domain in which said sub-domain dictionary including at least one of the determined compound and single words is included.

10. The machine translation apparatus according to claim 6, further comprising:

means for extracting one sentence from the source text of said first language, wherein said determining means, said setting means, and said means for creating a translated sentence are used for each extracted sentence; and in said setting means, when at least one of the compound and single words included in said dictionary having the priority set higher is not used over a predetermined number of sentences after the priority of said dictionary including at least one of said determined compound and single words is set higher than that of said base dictionary, the priority of said dictionary having the priority set higher is set lower than that of said base dictionary.

11. A machine translation method for providing a translation service using a base dictionary and at least one domain dictionary in a computer system and a computer network, which include first and second computers, in which said domain dictionary includes at least one of a first compound word dictionary and a first single word dictionary that includes triggers for changing priorities of dictionaries and at least one of a second compound word dictionary and a second single word dictionary that does not include said triggers for changing the priorities of dictionaries, said machine translation method comprising:

receiving a source text of said first language by said first computer;

analyzing said inputted source text to determine at least one of a compound word and a single word that is used in said source text;

judging whether at least one of said determined compound and single words is included in at least one of said first compound word dictionary and said first single word dictionary;

setting a priority of a dictionary including at least one of said first compound word and single word dictionaries higher than that of said base dictionary if said judgment is true;

creating a translated sentence of said second language by use of said dictionary having the priority set higher; and transmitting the translated sentence of said second language to said second computer.

* * * * *